United States Patent Office 2,909,438

Patented Oct. 20, 1959

2,909,438

VITREOUS ENAMEL COMPOSITIONS FOR ALUMINUM AND ITS ALLOYS

Karl Kautz, Pittsburgh, Pa., assignor to Vitro Corporation of America, Verona, N.J.

No Drawing. Application February 6, 1956 Serial No. 563,811

17 Claims. (Cl. 106—48)

This invention relates to vitreous enamel compositions for producing protective and decorative coatings on aluminum and aluminum alloys, and more particularly to vitreous enamel compositions based upon zinc oxide as a flux and insolubilizing agent, and upon antimony trioxide to promote adherence of the compositions to the aluminum and aluminum alloys.

This application is a continuation-in-part, of application Serial No. 451,881, filed August 24, 1954, and now abandoned.

Aluminum and its alloys have many properties which suit them for a variety of uses, but the exposed metals cannot be used where the surface of the aluminum is subject to chemical attack. Aluminum is very reactive and will corrode rapidly in contact with many materials, such as sea water and mild alkaline detergents.

Efforts have been made heretofore to overcome this difficulty by coating the aluminum or aluminum alloy surface with a protective covering. Paints and lacquers have been used, but these coatings are not permanent. Vitreous enamels have been tried, but it is difficult to formulate a vitreous enamel which will adhere to aluminum.

The coating of aluminum and its alloys with vitreous enamels presents many problems. Aluminum articles are known to deform and lose tensile strength at temperatures in excess of approximately 1000° F. Most vitreous enamels used for enameling cast iron and steel are intended to mature at temperatures of the order of 1300 to 1500° F., and cannot of course be used for aluminum. Many enamel compositions which have been available and which mature at low enough temperatures do not adhere to the aluminum very well, and tend to flake or spall spontaneously from the aluminum after firing. The same result may occur after the aluminum has been exposed to weathering or to highly moisture laden atmosphere.

Various types of enamel compositions said to be particularly suitable for aluminum have been proposed.

The Warga Patents Nos. 1,230,958 and 1,346,475 disclose enamels which do not mature to a glossy surface at temperatures low enough to avoid deterioration of the aluminum article, and still possess resistance to weathering and other chemical action as well as adherence to the metal.

The Deyrup Patents Nos. 2,467,114, 2,544,139 and 2,653,877 describe vitreous enamel compositions intended for use with aluminum and its alloys based upon plumbous oxide PbO, silicon dioxide $SiO_2$ and lithium oxide $Li_2O$ as essential ingredients, and sodium oxide $Na_2O$, potassium oxide $K_2O$, and titanium dioxide $TiO_2$, as optional ingredients, in specified proportions. The lead oxide is used to attain the required low maturing temperature. However, certain trade restrictions make the manufacture and use of lead in vitreous enamel compositions objectionable, because of its toxicity. Also, lithium oxide is relatively expensive.

U.S. Patent No. 2,660,531 to Fraser and Cianchi describes enamel compositions based upon alkaline earth oxides as essential ingredients, together with a small amount of boric oxide and, optionally, of aluminum oxide. These avoid the use of lead oxide. However, the alkaline earth metal oxides are quite reactive, being strong bases sparsely soluble in water, so that the acid resistance of these enamels is not as good as might be desired. Also, they show poor bonding to aluminum.

It has now been determined that neither lead oxide nor lithium oxide nor alkaline earth oxides are requisite for the formulation of vitreous enamels useful in coating aluminum and aluminum rich alloys. Compositions can be formulated based upon zinc oxide ZnO and antimony trioxide $Sb_2O_3$ and the vitreous enamel compositions of the invention can be applied to aluminum metal at temperatures within the range from 900 to 1000° F., low enough to avoid damage to the metal but high enough to provide hard, smooth, glossy, durable coatings which do not tend to spall or flake from the metal base, and which provide excellent protection against attack by the usual chemical agents.

The compositions of the invention contain as essential ingredients boron trioxide $B_2O_3$ as a flux and a glass-forming agent, silicon dioxide $SiO_2$ as a glass-forming agent, titanium dioxide $TiO_2$ as an opacifying, glass-forming and insolubilizing agent, zinc oxide ZnO as a flux and insolubilizing agent, both sodium and potassium oxides $Na_2O$ and $K_2O$ as fluxes, because their eutectic mixture gives a lower fusion temperature than either alone, and antimony trioxide $Sb_2O_3$ as an adhesion-promoting agent to aid in adhering the enamel compositions to the metal. These components are used in the following proportions:

| | Range in Weight (Percent) | Range in Mole (Percent) |
|---|---|---|
| ZnO | 0.5–10.0 | 0.75–9.0 |
| $K_2O$ | 5.0–25.0 | 6.0–23.0 |
| $Na_2O$ | 5.0–25.0 | 6.0–22.0 |
| $SiO_2$ | 15.0–30.0 | 15.0–35.0 |
| $TiO_2$ | 15.0–35.0 | 14.0–35.0 |
| $B_2O_3$ | 1.0–15.0 | 1.0–16.0 |
| $Sb_2O_3$ | 3.0–13.0 | 0.75-4.0 |

The above-named ingredients can be supplied to the enamel compositions as any convenient compound of the named elements, which may be the oxide itself, if available, or another compound easily decomposed or reduced under the enamel firing conditions to form the oxide. Thus, potassium carbonate and sodium carbonate are convenient sources of potassium oxide and sodium oxide, respectively. Boric acid is a convenient source of boron trioxide. The other named oxides are readily available, and would usually be used.

In order to formulate compositions useful for special purposes, other substances can be used in partial substitution for the named essential ingredients. The substitutions are always on a mole-for-mole basis. However, for convenience, the amounts in the following discussion are given in weight percents.

The antimony trioxide promotes adherence to the aluminum because it is an easily reduceable oxide, that is, it is reduced by aluminum at the firing temperatures. Other aluminum-reduceable oxides can be used partially to replace the antimony trioxide. In this category are lead oxide PbO, which also acts as a flux and can be used in amounts up to about 25%, cadmium oxide CdO, in amounts up to 7.5%, cupric oxide CuO, in amounts up to 7%, cobaltous oxide CoO, in amounts up to 13%, nickelous oxide NiO, in amounts up to 13%, ferrous oxide FeO, in amounts up to 13%, stannic oxide $SnO_2$ in amounts up to 8%, and molybdic oxide $MoO_3$ in amounts up to 6%.

Cadmium oxide, cupric oxide, cobaltous oxide, nickelous oxide and ferrous oxide, because they act as fluxes, can be used in the amounts stated to partially replace the zinc oxide.

In order to promote lower fusability and increase insolubility of the glasses, up to 5% lithium oxide $Li_2O$ can be used as a flux in partial replacement for sodium and potassium oxides. This material can be supplied as lithium carbonate.

Cobaltous oxide can be added to the batch to provide a transparent blue enamel. Cadmium oxide will make the enamel more suitable for red colors, using cadmium sulfoselenide pigments.

In the usual enamel practice the raw materials constituting the enamel are first smelted at temperatures above 1900° F., and the resulting glass is quenched. This frit is then milled with suitable electrolytes and floating agents, if desired, together with pigments, if necessary, and sprayed on the metalware. After partially drying the ware is fired at a temperature high enough to produce fusion of the enamel, but low enough to avoid damage to the metal, and the familiar glossy, hard, chemically resistant, vitreous enamel finish results.

Frits can be prepared in accordance with the invention by weighing out a batch of the ingredients to supply the stated oxides in the required amounts, mixing and heating the batch until it is completely melted to form a homogeneous glass. Temperatures within the range from 1900 to 2200° F. are suitable. The molten glass is fritted by running it into water, in which it shatters into small pieces, forming the frit. The frit then is dried at a low temperature, and ground either dry or with water or other suitable liquid. During the grinding it may be convenient to include with the frit, pigments such as titanium dioxide, in amounts up to 30% by weight of the total enamel composition. Pigments, of course, can be omitted if a clear, colorless, vitreous coating is desired.

The powdered enamel then desirably is dispersed or suspended in a suitable liquid, which may be applied to the aluminum by any of the well known procedures, including spraying, dipping, brushing, stenciling, etc. Alcohol-water dispersions have been found to be satisfactory when prepared and applied by skilled personnel. When a dispersion of this type is not carefully handled, however, the resultant enamel coating has a tendency to tear and crawl. This problem can be avoided by using an antitearing vehicle such as sodium metasilicate or sodium polysilicate in conjunction with borax, boric acid, sodium nitrite or sodium tetraphosphate in water suspensions. Any manner which will provide a uniform and smooth coating of the composition before firing can be used. The surface of the aluminum rich metal which is to receive the enamel is first prepared for enamelling in conventional manner, for example, by pretreating this surface with a chromate, perchlorate or permanganate solution in aqueous media and subsequently heat-treating this surface. The thickness of the coat will of course depend upon the thickness of the final enamel desired, and will vary within the range from 15 to 30 g. per square foot per coat. Coating thicknesses of 0.002 to 0.003 inch are preferred. Generally, a ground coat and one finish coat are applied, but one coat may be sufficient, and more coats could of course be added if desired, the furnace firing being repeated after application of each coat.

The coated metal then is fired in a suitable furnace for a time and at a temperature sufficient to fuse the enamel to a continuous glassy coating. The temperature should be high enough to melt the enamel, but not high enough to injure the metal. Temperatures within the range from 900 to 1000° F. are entirely satisfactory, and usually the enamel has matured in a few minutes, rarely more than ten minutes being necessary.

The following examples illustrate enamel compositions coming within the invention:

EXAMPLES 1 AND 2

These formulations produce clear vitreous enamels:

*Table I*

| | Batch Weight Percent Compositions | |
|---|---|---|
| | Example 1 | Example 2 |
| Zinc Oxide (ZnO) | 6.2 | 5.0 |
| Potassium Carbonate ($K_2CO_3$) | 16.6 | 19.8 |
| Sodium Carbonate ($Na_2CO_3$) | 25.4 | 21.7 |
| Silica ($SiO_2$) | 22.0 | 14.7 |
| Titanium Dioxide ($TiO_2$) | 22.0 | 14.7 |
| Boric Acid ($H_3BO_3$) | 4.6 | 15.2 |
| Antimony Trioxide ($Sb_2O_3$) | 3.2 | 8.9 |
| | 100.0 | 100.0 |

*Table II*

| | Calculated Weight Percent Compositions | |
|---|---|---|
| | Example 1 | Example 2 |
| ZnO | 7.5 | 6.4 |
| $K_2O$ | 13.6 | 17.2 |
| $Na_2O$ | 18.0 | 16.2 |
| $SiO_2$ | 26.7 | 18.9 |
| $TiO_2$ | 26.7 | 18.9 |
| $B_2O_3$ | 3.6 | 11.0 |
| $Sb_2O_3$ | 3.9 | 11.4 |
| | 100.0 | 100.0 |

*Table III*

| | Empirical Molecular Formulae [1] | |
|---|---|---|
| | Example 1 | Example 2 |
| ZnO | 0.175 | 0.15 |
| $K_2O$ | 0.275 | 0.35 |
| $Na_2O$ | 0.55 | 0.50 |
| $SiO_2$ | 0.84 | 0.60 |
| $TiO_2$ | 0.63 | 0.45 |
| $B_2O_3$ | 0.084 | 0.30 |
| $Sb_2O_3$ | 0.025 | 0.075 |
| | 2.579 | 2.425 |

[1] Molecular percent is obtained by dividing each equivalent by the sum of equivalents and multiplying by 100.

The above compositions were smelted at 2050° F., fritted by running into cold water, dried and ground to pass 325 mesh with 36 parts water, 4 parts sodium metasilicate and 3 parts boric acid per 100 parts frit. The suspension was then sprayed on an aluminum sheet to give a coating of about 15 grams per square foot. This coating was fired at 950° F. for seven minutes. A second coating was applied of about 15 grams per square foot, and fired at the same temperature. A hard, chemically resistant vitreous enamel which was clear and colorless was obtained.

In order to test the spalling resistance of these enamels, the enamelled sheets were immersed in a 5% aqueous solution of ammonium chloride for 96 hours. Spalling did not take place.

The enamelled sheets were spot tested for acid resistance by placing a few drops of 10% aqueous citric acid on a portion of the sheet, covering this portion with a watch glass. The glass was removed after a fifteen minute interval. No surface changes in the enamels had occurred.

EXAMPLES 3 TO 7

The following compositions yield clear vitreous enamels and illustrate the use of other oxides with zinc oxide and the use of other aluminum-reduceable oxides with antimony trioxide.

*Table IV*

| Examples Nos. | Batch Weight Percent Compositions | | | | |
|---|---|---|---|---|---|
| | 3 | 4 | 5 | 6 | 7 |
| Zinc Oxide (ZnO) | 2.8 | 1.8 | 5.4 | 1.8 | 5.3 |
| Potassium Carbonate ($K_2CO_3$) | 12.7 | 19.3 | 21.2 | 21.3 | 15.0 |
| Sodium Carbonate ($Na_2CO_3$) | 19.5 | 24.6 | 23.8 | 23.4 | 20.9 |
| Silica ($SiO_2$) | 16.9 | 16.8 | 15.4 | 15.9 | 18.3 |
| Titanium Dioxide ($TiO_2$) | 11.1 | 22.2 | 21.2 | 21.2 | 18.3 |
| Boric Acid ($H_3BO_3$) | 8.7 | 6.9 | 6.6 | 6.6 | 7.5 |
| Antimony Trioxide ($Sb_2O_3$) | 10.2 | 2.7 | 3.2 | 6.4 | 9.5 |
| Lithium Carbonate ($Li_2CO_3$) | 6.8 | | | | |
| Cadmium Carbonate ($CdCO_3$) | 6.0 | | | | |
| Stannic Oxide ($SnO_2$) | 5.3 | | | | |
| Molybdic Oxide ($MoO_3$) | | | 3.2 | | |
| Cupric Oxide (CuO) | | | | 3.5 | 5.2 |
| Cobaltic Oxide ($Co_3O_4$) | | 1.4 | | | |
| Nickelic Oxide ($Ni_2O_3$) | | 1.5 | | | |
| Ferric Oxide ($Fe_2O_3$) | | 2.8 | | | |
| | 100.00 | 100.00 | 100.00 | 100.00 | 100.00 |

*Table V*

| Examples Nos. | Calculated Weight Percent Compositions | | | | |
|---|---|---|---|---|---|
| | 3 | 4 | 5 | 6 | 7 |
| ZnO | 3.6 | 2.5 | 7.1 | 2.4 | 6.4 |
| $K_2O$ | 11.0 | 17.6 | 19.2 | 19.3 | 12.3 |
| $Na_2O$ | 14.6 | 19.4 | 18.1 | 18.2 | 14.6 |
| $SiO_2$ | 21.5 | 22.4 | 21.1 | 21.0 | 22.0 |
| $TiO_2$ | 14.2 | 22.4 | 21.1 | 21.0 | 22.0 |
| $B_2O_3$ | 6.2 | 5.2 | 4.9 | 4.9 | 5.1 |
| $Sb_2O_3$ | 13.0 | 3.6 | 4.3 | 8.5 | 11.3 |
| $Li_2O$ | 3.5 | | | | |
| CdO | 5.7 | | | | |
| $SnO_2$ | 6.7 | | | | |
| $MoO_3$ | | | 4.2 | | |
| CuO | | | | 4.7 | 6.3 |
| CoO | | 1.8 | | | |
| NiO | | 1.7 | | | |
| FeO | | 3.4 | | | |
| | 100.00 | 100.00 | 100.00 | 100.00 | 100.00 |

*Table VI*

| Examples Nos. | Empirical Molecular Formulae [1] | | | | |
|---|---|---|---|---|---|
| | 3 | 4 | 5 | 6 | 7 |
| Zno | 0.08 | 0.05 | 0.15 | 0.05 | 0.15 |
| $K_2O$ | 0.21 | 0.30 | 0.35 | 0.35 | 0.25 |
| $Na_2O$ | 0.42 | 0.50 | 0.50 | 0.50 | 0.45 |
| $SiO_2$ | 0.64 | 0.60 | 0.60 | 0.60 | 0.70 |
| $TiO_2$ | 0.32 | 0.60 | 0.60 | 0.60 | 0.525 |
| $B_2O_3$ | 0.16 | 0.12 | 0.12 | 0.12 | 0.14 |
| $Sb_2O_3$ | 0.08 | 0.02 | 0.025 | 0.05 | 0.075 |
| $Li_2O$ | 0.21 | | | | |
| CdO | 0.08 | | | | |
| $SnO_2$ | 0.08 | | | | |
| $MoO_3$ | | | 0.05 | | |
| CuO | | | | 0.10 | 0.15 |
| CoO | | 0.0375 | | | |
| NiO | | 0.0375 | | | |
| FeO | | 0.075 | | | |
| | 2.280 | 2.340 | 2.395 | 2.370 | 2.440 |

[1] Molecular percent is obtained by dividing each equivalent by the sum of equivalents and multiplying by 100.

Example 3 illustrates use of zinc oxide and cadmium oxide as fluxes, and the use of stannous oxide for additional adherence-promoting properties. Lithium oxide is used with the potassium and sodium oxides to give a lower fusion temperature and lower solubility.

Example 4 is a coposition in which the zinc and antimony oxides are supplemented by a mixture of cobaltous, nickelous and ferrous oxides. This composition has good adhering properties because the cobaltous, nickelous and ferrous oxides also act to promote adherence.

Example 5 utilizes molybdic oxide in addition to the antimony trioxide, and has good adherence properties because of the presence of both.

Examples 6 and 7 utilize the aluminum-reducible cupric oxide to promote adherence.

The above compositions were smelted at 2100° F., fritted by running into cold water, dried and ground to pass 325 mesh with 3 parts sodium metasilicate, 5 parts boric acid and 36 parts water per 100 parts frit. The slip thus produced after screening through a 100-mesh screen was sprayed on an aluminum-magnesium alloy sheet to produce a coating weighing about 20 grams per square foot. This was fired at 1000° F. A second coating of about 15 grams per square foot was applied and fired at the same temperature. Depending upon the frit used, a colored or colorless, hard, chemically resistant vitreous enamel finish was obtained.

EXAMPLES 8 AND 9

The following compositions give clear vitreous glasses when smelted and fritted, but when ground extremely fine and fired at 1000° F., the titanium dioxide precipitates as anatase or rutile, resulting in a very white enamel with high gloss and an extremely high opacity.

*Table VII*

| | Batch Weight Percent Compositions | |
|---|---|---|
| | Example 8 | Example 9 |
| Zinc Oxide (ZnO) | 4.2 | 4.5 |
| Potassium Carbonate ($K_2CO_3$) | 17.5 | 18.1 |
| Sodium Carbonate ($Na_3Co_3$) | 19.1 | 20.0 |
| Silica ($SiO_2$) | 12.9 | 12.4 |
| Titanium Dioxide ($TiO_2$) | 25.8 | 18.1 |
| Boric Acid ($H_3BO_3$) | 17.9 | 18.7 |
| Antimony Trioxide ($Sb_2O_3$) | 2.6 | 8.2 |
| | 100.0 | 100.0 |

*Table VIII*

| | Calculated Weight percent Compositions | |
|---|---|---|
| | Example 8 | Example 9 |
| ZnO | 5.5 | 5.9 |
| $K_2O$ | 15.0 | 15.9 |
| $Na_2O$ | 14.1 | 15.0 |
| $SiO_2$ | 16.4 | 16.0 |
| $TiO_2$ | 32.9 | 23.2 |
| $B_2O_3$ | 12.8 | 13.5 |
| $Sb_2O_3$ | 3.3 | 10.5 |
| | 100.0 | 100.0 |

*Table IX*

| | Empirical Molecular Formulae [1] | |
|---|---|---|
| | Example 8 | Example 9 |
| ZnO | 0.15 | 0.15 |
| $K_2O$ | 0.35 | 0 35 |
| $Na_2O$ | 0.50 | 0.50 |
| $SiO_2$ | 0.60 | 0.55 |
| $TiO_2$ | 0.90 | 0.60 |
| $B_2O_3$ | 0.40 | 0.40 |
| $Sb_2O_3$ | 0.025 | 0.075 |
| | 2.925 | 2.625 |

[1] Molecular percent is obtained by dividing each equivalent by the sum of equivalents and multiplying by 100.

The above compositions were smelted at 2100° F., fritted by running into cold water, dried and ground to pass 325 mesh with 3 parts sodium silicate, 3 parts borax and 35 parts water per 100 parts frit. The suspension thus produced was sprayed on an aluminum sheet to produce a coating weighing about 20 grams per square foot. This was fired at 1000° F. A second coating of about 20 grams per square foot was applied and fired at the same temperature. A very white, glossy, hard, chemically resistant vitreous enamel finish was obtained.

EXAMPLES 10 TO 14

These compositions show how lead oxide can be used with the zinc oxide to make high gloss, good adhering compositions.

*Table X*

| Example Nos. | Batch Weight Percent Compositions | | | | |
|---|---|---|---|---|---|
| | 10 | 11 | 12 | 13 | 14 |
| Zinc Oxide (ZnO) | 1.6 | 0.7 | 0.8 | 2.5 | 2.5 |
| Potassium Carbonate ($K_2CO_3$) | 13.7 | 13.2 | 15.0 | 15.6 | 16.4 |
| Sodium Carbonate ($Na_2CO_3$) | 16.8 | 19.2 | 21.9 | 24.0 | 25.0 |
| Silica ($SiO_2$) | 19.0 | 19.2 | 19.8 | 20.8 | 21.7 |
| Titanium Dioxide ($TiO_2$) | 19.0 | 19.2 | 19.8 | 20.8 | 21.7 |
| Boric Acid ($H_3BO_3$) | 2.0 | 3.9 | 4.1 | 4.3 | 4.4 |
| Antimony Trioxide ($Sb_2O_3$) | 3.0 | 2.8 | 2.9 | 3.0 | 3.1 |
| Red Lead ($Pb_3O_4$) | 18.1 | 21.8 | 15.7 | 9.4 | 2.5 |
| Cadmium Carbonate ($CdCO_3$) | 6.8 | ------ | ------ | ------ | ------ |

*Table XI*

| Examples Nos. | Calculated Weight Percent Compositions | | | | |
|---|---|---|---|---|---|
| | 10 | 11 | 12 | 13 | 14 |
| ZnO | 1.9 | 0.9 | 1.0 | 3.0 | 6.3 |
| $K_2O$ | 10.9 | 10.4 | 12.0 | 12.7 | 13.4 |
| $Na_2O$ | 11.6 | 13.1 | 15.2 | 16.8 | 17.7 |
| $SiO_2$ | 22.2 | 22.4 | 23.5 | 24.8 | 26.2 |
| $TiO_2$ | 22.2 | 22.4 | 23.5 | 24.8 | 26.2 |
| $B_2O_3$ | 1.3 | 2.9 | 3.1 | 3.3 | 3.5 |
| $Sb_2O_3$ | 3.4 | 3.2 | 3.4 | 3.6 | 3.8 |
| $Pb_3O_4$ | 20.6 | 24.7 | 18.3 | 11.0 | 2.9 |
| CdO | 5.9 | -------- | -------- | -------- | -------- |

*Table XII*

| Examples Nos. | Empirical Molecular Formulae [1] | | | | |
|---|---|---|---|---|---|
| | 10 | 11 | 12 | 13 | 14 |
| ZnO | 0.05 | 0.025 | 0.025 | 0.075 | 0.150 |
| $K_2O$ | 0.25 | 0.25 | 0.275 | 0.275 | 0.275 |
| $Na_2O$ | 0.40 | 0.475 | 0.525 | 0.55 | 0.55 |
| $SiO_2$ | 0.80 | 0.84 | 0.84 | 0.84 | 0.84 |
| $TiO_2$ | 0.60 | 0.63 | 0.63 | 0.63 | 0.63 |
| $B_2O_3$ | 0.04 | 0.084 | 0.084 | 0.084 | 0.084 |
| $Sb_2O_3$ | 0.025 | 0.025 | 0.025 | 0.025 | 0.025 |
| $Pb_3O_4$ | 0.20 | 0.25 | 0.175 | 0.10 | 0.025 |
| CdO | 0.10 | -------- | -------- | -------- | -------- |
| | 2.465 | 2.579 | 2.579 | 2.579 | 2.579 |

[1] Molecular percent is obtained by dividing each equivalent by the sum of equivalents and multiplying by 100.

The above compositions were smelted at 2100° F., fritted by running into cold water, dried and ground to pass 325 mesh with 3 parts borax, 3 parts sodium metasilicate and 36 parts water per 100 parts frit. This milled enamel slip was sprayed on an aluminum sheet to produce a coating weighing about 20 grams per square foot. This was fired at 1000° F. A second coating of about 15 grams per square foot was applied and fired at the same temperature. A clear, colorless, hard, chemically resistant vitreous enamel finish was obtained.

The fritted enamel compositions in accordance with the invention are particularly useful in making chalkboard enamel compositions. Milled chalkboard enamel slips are prepared by incorporating in the ball-mill or grinding batch with a fritted enamel composition of the invention appropriate amounts of abrasive or matting agents, ceramic color pigments for coloring, boric acid and sodium metasilicate as anti-tearing and setting-up compounds, and water. The batch is ground very fine, so that less than 0.25 g. of residue remains when 50 ml. of ground slip are washed through a 325 mesh screen.

The amounts of these ingredients are not critical, and would be used to formulate an enamel of the desired hardness and other use properties.

Usually, the amount of the abrasive or matting agent or mixture thereof will lie within the range from about 20 to about 60%, the ceramic color pigment or mixture thereof will constitute from about 0 to about 40% and the anti-tearing and setting-up compound will constitute from about 5 to about 12%.

About half of the chalkboard enamel composition will constitute the frit of the invention, but the amount of this, too, may be widely varied, and usually would lie within the range from about 35 to about 70%. The vehicle is water, and this constitutes the remainder of the composition. The amounts of the ingredients are selected from the above ranges to give, after firing, a chalkboard having high scratch resistance, the desired matte finish, and perfect writing, erasing and wearing properties, while retaining a good enamel to aluminum or aluminum alloy bond by incorporation of a suitable amount of a fritted enamel composition of the invention.

The abrasive or matting agents which impart a matte finish to the chalkboard are well known. Calcined alumina is quite satisfactory, and is preferred. Other forms of alumina may be used, such as alumina hydrate or very finely ground fused alumina, and these are satisfactory. When properly fired, alumina remains undissolved in the glass matrix in the form of corundum crystals. Corundum has a hardness of 9 on Moh's scale. The chalkboard surfaces in accordance with the invention containing alumina in the amounts specified show scratch hardnesses ranging from 8 to 9. Other matting or abrasive agents can be used with good results, but at the cost of a lower scratch resistance. In this group are chromium oxide, titanium dioxide, zirconium oxide, zirconium silicate, tin oxide, antimony oxide and silica. These are used in various combinations of one or more with the alumina, or they can be used without alumina in various combinations of two or more, and in various proportions, within the stated range, depending upon the effect and the surface hardness required.

The colored ceramic pigments which can be used include the conventional ceramic pigments. The preferred anti-tearing compounds are boric acid and sodium metasilicate, but other compounds known to impart tear resistance and improve setting-up of the enamels can be used. Further details need not be given as to these components, inasmuch as they are conventional in enamel mill batches.

The chalkboard enamel slips of the invention usually are applied by spraying to the surface of the aluminum, aluminum alloy or aluminum coated steel to be coated. Other conventional coating methods can be used, such as by dipping or spraying. They can also be used as covering coats over ground coat-enamelled steel. They are fired wet after coating, or after air-drying until almost dry, or after drying rapidly at temperatures above 350° F. If dried at low temperatures, of the order of 150 to 230° F., tearing or parting of the coat may result. Chalkboard enamel coatings are fired in the range from about 950 to about 1050° F., according to the frit used and the makeup of the mill batch.

The following are examples of typical chalkboard enamel mill batches, and of chalkboards prepared therefrom.

*Table XIII*

[Weight percent compositions.]

|  | Examples Nos. | |
| --- | --- | --- |
|  | 15 | 16 |
| Frit of Example 3 | 52.5 |  |
| Frit of Example 10 |  | 51.0 |
| Calcined Alumina |  | 36.4 |
| Titanium Dioxide | 8.4 | 2.42 |
| Chromium Oxide | 21.5 | 1.68 |
| Antimony Oxide | 6.1 |  |
| Bluegreen Pigment (ceramic) | 7.4 | 5.10 |
| Yellow Pigment (ceramic) | 4.1 | 3.40 |
| Boric Acid | 4.0 | 3.0 |
| Sodium Metasilicate | 6.0 | 5.25 |
| Water | 36.0 | 36.0 |
|  | 100.0 | 100.0 |

The components outlined in the table were blended and ground in a ball mill to such a fineness that less than 0.25 g. of residue remained when 50 ml. of the suspension was washed through a 325 mesh screen. The compositions then were sprayed on one surface of an aluminum-coated steel bearing an aluminum coating approximately 1 mil thick. These plates were fired wet at 1000° F. The resulting chalkboard surface was light green, had a scratch hardness on Moh's scale of above 8, excellent scratch resistance, and a good matte finish, with perfect writing, erasing and wearing properties.

The enamels of the invention can be used on aluminum and aluminum alloy surfaces, including articles formed of aluminum and aluminum and aluminum-alloy surfaces coated upon other supports, such as aluminized steel, which bears a continuous aluminum coating averaging from one to several mils thick on its surface. Typical aluminums and aluminum alloys available commercially which can be coated with the enamels of the invention are Alcoa 2S, Alcoa 3S (aluminum alloy containing 1.2% manganese), Alcoa 52S (aluminum alloy containing 0.25% chromium and 2.5% magnesium), Alcoa 53S (aluminum alloy containing 1.3% magnesium, 0.7% silicon and 0.25% chromium), Alcoa 43 (aluminum alloy containing 5% silicon), Alcoa B214 (aluminum alloy containing 3.8% magnesium and 1.8% silicon), Alcoa 220T4 (aluminum alloy containing 10% magnesium) Aluminum 99+, Aluminum 98–99, 40 alloy (aluminum alloy containing 4% copper) 40N alloy (aluminum alloy containing 4% magnesium) Red X10 (aluminum alloy containnig 10% silicon, 1.5% copper, 0.6% manganese, and 0.5% magnesium), and Y alloy (aluminum alloy containing 4% copper, 1.5% nickel, and 1.5% magnesium). A typical aluminized steel is Armco, which has an aluminum coating one mil thick.

The enamels of the invention have extremely low fusion points, and yet maintain a degree of resistance to chemical agents, especially acids, which hitherto has been believed possible only with enamel compositions having a fusion point of at least 300° F. higher. In addition to their low fusion point, the enamels of the invention have high resistivity to chemical agents. They will adhere to the aluminum or aluminum alloy surface even when the coated surfaces are exposed to thermal shock or to mechanical flexing. These properties are obtainable with relatively thick enamel layers, thick enough to provide freedom from pores and other imperfections. It is thought that the antimony trioxide, a component of the enamel, becomes chemically bonded to the aluminum, or to the aluminum oxide film on the surface with the aluminum, or perhaps alloyed with the aluminum if it is reduced to the metal during firing, and this is believed to be in part responsible for their adhesion to the aluminum surface despite flexing and thermal shock. However, this is only a theory; it has not been verified as yet by experimental evidence.

Because the enamels of the invention are lead-free or have a very low lead content, they are nontoxic or at least far less toxic than the lead-based enamels heretofore available. Thus, they are far less hazardous to use in the shop and on ware. The low lead content makes possible the production of far better white and colored enamels. The enamels of the invention have a high expansion coefficient, more closely approximating that of aluminum and aluminum alloys, so that the chance of spalling is greatly reduced.

Because the enamels of the invention are free from alkaline earth metal compounds, they have superior acid resistance and the bonding to aluminum is greatly improved.

All parts and percentages in the specification and claims are by weight, unless otherwise indicated.

I claim:

1. A vitreous enamel composition especially adapted for use as a protective or decorative coating for aluminum and aluminum base alloys and adapted to be fired at a temperature within the range of from about 900° to about 1000° F. consisting essentially of from about 0.5 to about 10% zinc oxide, from about 5 to about 25% potassium oxide, from about 5 to about 25% sodium oxide, from 0 to about 5% lithium oxide, from 15 to about 30% silica, from about 15 to about 35% titanium dioxide, from about 1 to about 15% boric oxide, from 0 to about 25% plumbous oxide and from about 3 to about 13% antimony trioxide, the level of combined sodium oxide, potassium oxide and lithium oxide coming within the range of from about 22.5 to about 37.5%, and the said weight percentages being based upon the composition of the enamel after firing.

2. A composition in accordance with claim 1 which contains up to about 7.5% cadmium oxide as a second flux supplementing the zinc oxide.

3. A composition in accordance with claim 1 which contains up to about 7% cupric oxide supplementing the adhesion-promoting antimony trioxide.

4. A composition in accordance with claim 1 which contains up to about 13% total of a mixture of cobaltous oxide, nickelous oxide and ferrous oxide supplementing the adhesion-promoting antimony trioxide.

5. A composition in accordance with claim 1 which contains up to 8% stannic oxide supplementing the adhesion-promoting antimony trioxide.

6. A composition in accordance with claim 1 which contains up to 6% molybdic oxide supplementing the adhesion-promoting antimony trioxide.

7. Aluminum metal coated with a vitreous enamel in accordance with claim 1.

8. Aluminum alloy coated with a vitreous enamel in accordance with claim 1.

9. A milled chalkboard enamel composition comprising from about 65 to about 30% of water and from about 35 to about 70% of a fritted vitreous enamel composition in accordance to claim 1, from 20 to 60% of an abrasive, from 5 to 12% of an anti-tearing compound selected from the group consisting of boric acid and sodium metasilicate, and up to 40% of a colored ceramic pigment.

10. A chalkboard comprising aluminum metal coated with a chalkboard enamel composition in accordance with claim 9.

11. A chalkboard comprising aluminum alloy coated with a chalkboard enamel composition in accordance with claim 9.

12. A chalkboard comprising aluminum-coated steel coated with a chalkboard enamel composition in accordance with claim 9.

13. A chalkboard enamel composition ready for milling with water comprising from about 35 to about 70% of a fritted vitreous enamel composition in accordance with claim 1, from 20 to 60% of an abrasive, from 5 to 12% of an anti-tearing compound selected from the group consisting of boric acid and sodium metasilicate, and up to 40% of a colored ceramic pigment.

14. Aluminum metal coated with a vitreous enamel in accordance with claim 5.

15. Aluminum alloy coated with a vitreous enamel in accordance with claim 5.

16. Aluminum metal coated with a vitreous enamel in accordance with claim 6.

17. Aluminum alloy coated with a vitreous enamel in accordance with claim 6.

References Cited in the file of this patent

UNITED STATES PATENTS

| | | |
|---|---|---|
| 1,756,393 | Snell | Apr. 29, 1930 |
| 1,848,567 | Kinzie | Mar. 8, 1932 |
| 2,278,867 | Deyrup | Apr. 7, 1942 |
| 2,334,043 | Staley et al. | Nov. 9, 1943 |
| 2,414,633 | Bryant | Jan. 21, 1947 |
| 2,474,636 | Oesterle | June 28, 1949 |
| 2,492,523 | Coffeen et al. | Dec. 27, 1949 |
| 2,653,877 | Deyrup | Sept. 29, 1953 |
| 2,753,271 | Treptow | June 3, 1956 |